March 17, 1959   R. J. JORGENSON   2,878,128
FROZEN FOOD PACKAGE
Filed May 2, 1955

INVENTOR.
Ralph J. Jorgenson
ECKHOFF & SLICK
ATTORNEYS
BY
A MEMBER OF THE FIRM

United States Patent Office 2,878,128
Patented Mar. 17, 1959

2,878,128

FROZEN FOOD PACKAGE

Ralph J. Jorgenson, San Francisco, Calif., assignor to Pacific Coast Foil Co., a corporation of California Application May 2, 1955, Serial No. 505,344

3 Claims. (Cl. 99—192)

This invention relates to a novel frozen food package and its preparation for consumption.

A popular food package comprises an aluminum tray or dish preformed to provide a plurality of compartments, each of which contains a different food. The food-filled dish is covered and sealed with a sheet of aluminum foil, placed in a carton, then frozen and so maintained until ready to use. To prepare for use the dish is removed from the carton and placed in an oven preheated to 450° F. and permitted to remain at that temperature in the oven for approximately 25 minutes. The plate is then removed from the oven and the aluminum foil cover is stripped from the plate.

The usual practice of applying the aluminum foil to the aluminum dinner plate has included crimping of the edge of the foil over the edge of the plate to secure the two together. This is only partially satisfactory, for various reasons, as will appear. In addition, if the aluminum foil is crimped about the edge of the plate with sufficient effectiveness to provide a good seal, then one attempting to open the package has difficulty in that the hot aluminum foil must be handled with the attendant possibility of a burn occurring. Further, the crimping of the aluminum foil about the edge of the plate does not seal the individual compartments from each other and when the plate is heated, the taste and flavor of one food is frequently imparted to another food on the plate.

It is in general the broad object of the present invention to provide a novel and improved food-carrying plate and cover therefor.

A further object of the present invention is to provide a novel and improved seal between an aluminum foil cover for an aluminum dinner plate filled with food.

The invention includes other objects and features of advantage, some of which, together with the foregoing, will appear hereinafter wherein the present preferred form of food package embodying the present invention is disclosed.

Figure 1:
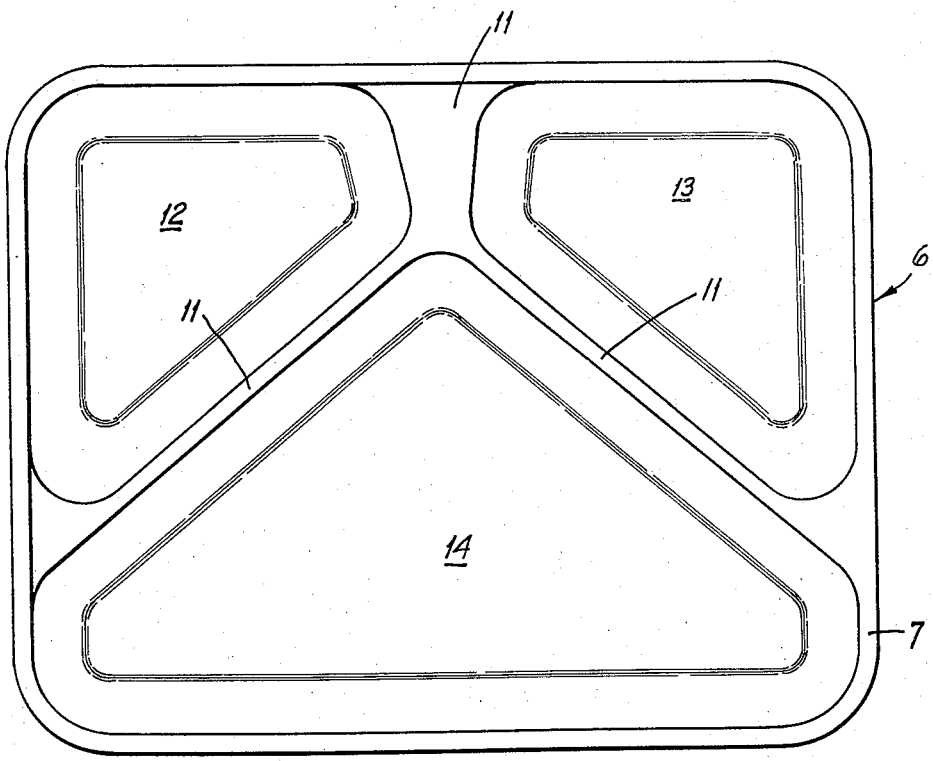

In the drawing accompanying and forming a part hereof, Figure 1 is a plan view of a typical dinner plate which can be utilized in achieving the novel food package of the present invention.

Figure 2:
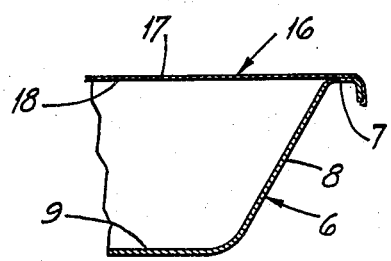

Figure 2 is a section taken through the side of the dinner plate and the attached cover.

Referring to the drawing, an aluminum foil dinner plate or dish, generally indicated at 6, has a flanged rim 7 about the outer sidewall 8, the rim being spaced above bottom 9 to provide a dish of a desired depth. The dish 6 is divided into one or more compartments, as desired, by the intermediate walls 11; in the form shown, these are effective to divide the plate into separate compartments 12, 13 and 14.

The practice heretofore has been to provide a continuous aluminum sheet over the entire plate as described, crimping the edge of this to the outer rim 7 provided about the plate. It will be obvious that this aluminum foil cannot be attached to walls 11 and transfer of food from one compartment to the other is possible in the event the package is tipped slightly. Further, during heating of the food, the vapor from one food will pass over and mingle with another food and may, in fact, alter the taste of the food in another compartment; again, the foods may lose their individual flavors and may taste like a mixture of all the foods.

In accordance with the present invention, I provide a suitable facing for the several compartments, providing this in the form of a cover sheet, generally indicated at 16, this sheet having an outer foil facing, generally indicated at 17, continuously attached to a lining face 18, as provided by a sheet of parchment paper or bleached sulfite. The cover 16 is applied over the entire package, being secured continuously to the rim 7 and the wall 11 so that a continuous seal is provided between compartments and over the entire surface of each compartment. In this manner, transfer of a food from one compartment to the other cannot occur even during heating of the materials.

The attachment of the cover sheet 16 is effected by utilizing a heat sealing material, applying this either to the rim 7 and the wall 11, or else to paper facing 18 of the cover 16. Heat and pressure are applied to those areas of the cover sheet immediately over the rim 7 and walls 11 to effect securing of the cover 16 in position to wall 11 and rim 7.

During the subsequent heating of the plate to raise the temperature of its contents to a temperature suitable for human consumption of the dish contents, usually 160° F. and higher, the heat sealing composition remains intact substantially throughout the entire period of heating and it is only during the last few minutes of heating that the heating composition fails with the result that when the plate is removed from the oven, the cover sheet 16 can be readily slipped from place without any tearing, tugging or pulling, as in the case of a crimped sheet, and the chance of a burn is greatly reduced. Thus, when a package made in accordance with the present invention is taken from a freezer and placed in an oven at 450° F., the cover will remain bonded for about 20 minutes, but by 25 minutes, when the contents are up to about 160° F., the cover will be loose and easy to remove.

As a heat sealing composition, I have successfully used various resins and resin-wax mixtures including various vinyl lacquers in which the resin is a copolymer of vinyl acetate and vinyl chloride. One particularly suitable lacquer is manufactured by Stoner-Mudge, Inc. and sold as S-4441. This is a lacquer containing a copolymer of vinyl chloride and vinyl acetate and a minor amount of a dibasic acid together with a plasticizer and a ketone solvent. It will be obvious to those skilled in the art that other bonding agents having the above enumerated physical properties can be used.

The lacquer identified above as S-4441 has been analyzed and is found to contain the following:

|   | Percent |
|---|---|
| Volatile matter | 60.0 |
|     Methyl isobutyl ketone, percent of volatile  31 | |
|     Alcohols, percent of volatile  19 | |
|     Aliphatic hydrocarbons, percent of volatile  23 | |
|     Aromatic hydrocarbons, percent of volatile  27 | |
| Mineral extender | 2.9 |
| Non-volatile vehicle | 37.1 |
|     Plasticizer, percent of non-volatile vehicle  5.4 | |
|     Alkyd resin solids, percent of non-volatile vehicle  34.9 | |
|     Vinyl resin, percent of non-volatile vehicle  59.7 | |

| | Percent |
|---|---|
| Total phthalic anhydride | 14.3 |
| Chlorine, percent of vinyl chloride-vinyl acetate copolymer | 50.0 |

The volatile matter listed above may be varied considerably by formulators with results which are entirely satisfactory. The alcohols found in S-4441 are a mixture of isobutyl alcohol and isopropyl alcohol. The aliphatic hydrocarbons are petroleum fractions containing 8-9 carbon atoms and the aromatic listed is toluene. This is merely a typical ketone formula lacquer thinner and may be varied considerably without significantly affecting the action of the product. The mineral extender is also a rather non-essential feature, but in this case consisted of a silicate-type material, predominantly magnesium silicate. Such material as diatomaceous earth could also be used. It is the non-volatile vehicle which is essential, for this contains the material which remains on driving off the other materials initially present. Most essential is the vinyl resin which, in the case of S-4441, is a vinyl chloride-vinyl acetate copolymer having nine vinyl chloride groups to one vinyl acetate group and a molecular weight of 10,000–12,000. The alkyl resin solids contained about two-thirds phthalic anhydride and one-third oil acid, which contains a small proportion of dibasic acid. This is a customary ingredient in alkyl resin solid. The plasticizer used in S-4441 was a phthalic type, predominantly dioctyl phthalate. A certain amount of additional phthalic anhydride was included in the plasticizer. Thus, the designation "total phthalic anhydride" includes that phthalic anhydride included in the alkyl resin solids and that small amount found in the plasticizer. The aliphatic hydrocarbons used had a dry of less than 120° C.

I claim:

1. A frozen food package comprising an aluminum dish having an outer rim and an inner wall defining a plurality of compartments separated from one another by the wall, the rim and wall on the dish being in a common plane, a paper-faced foil cover sheet positioned over the dish and providing a one-piece integral cover for the separate compartments of the dish, and a heat-sealing composition bonding the paper-face to the wall and the rim to provide a cover separating each compartment from the other, the heat-sealing composition retaining its bonding strength when the frozen package containing food is placed in an oven at 450° F. for 20 minutes and which loses its bonding strength after 25 minutes.

2. The package of claim 1 wherein the heat-sealing composition is a vinyl chloride-vinyl acetate copolymer.

3. A frozen food package comprising an aluminum dish having an outer rim, a paper-faced foil cover sheet positioned over the dish and providing a one-piece integral cover for the dish, and a heat-sealing composition bonding the paper-face to the rim to provide a cover, the heat-sealing composition retaining its bonding strength when the frozen package containing food is placed in an oven at 450° F. for 20 minutes and which loses its bonding strength after 25 minutes.

References Cited in the file of this patent

UNITED STATES PATENTS

| | | |
|---|---|---|
| 2,020,776 | Goebel | Nov. 12, 1935 |
| 2,096,825 | Roman | Oct. 26, 1937 |
| 2,156,987 | Hill | May 2, 1939 |
| 2,318,184 | Rojas | May 4, 1943 |
| 2,353,198 | Soday | July 11, 1944 |

OTHER REFERENCES

Food Engineering, November 1951, p. 156.

Bakelite Corporation "Vinylite (vinyl acetate) Resins," October 1947, pp. 6, 154, Vinyl Digest.